United States Patent
Na et al.

(10) Patent No.: US 8,174,789 B2
(45) Date of Patent: May 8, 2012

(54) MAGNETIC RECORDING HEAD COMPRISING CONICAL MAIN POLE TIP AND METHOD OF MANUFACTURING THE SAME

(75) Inventors: Kyoung-won Na, Seoul (KR); Kook-hyun Sunwoo, Hwaseong-si (KR)

(73) Assignee: Seagate Technology LLC, Cupertino, CA (US)

( * ) Notice: Subject to any disclaimer, the term of this patent is extended or adjusted under 35 U.S.C. 154(b) by 1038 days.

(21) Appl. No.: 12/114,845

(22) Filed: May 5, 2008

(65) Prior Publication Data

US 2009/0103214 A1    Apr. 23, 2009

(30) Foreign Application Priority Data

Oct. 17, 2007    (KR) .................. 10-2007-0104474

(51) Int. Cl.
*G11B 5/127*    (2006.01)
*G11B 5/31*    (2006.01)

(52) U.S. Cl. ................ 360/125.03; 360/125.12

(58) Field of Classification Search ............. 360/122, 360/125.03, 125.08, 125.1, 125.11, 125.12, 360/125.14, 125.15; 29/603.15, 603.18
See application file for complete search history.

(56) References Cited

U.S. PATENT DOCUMENTS

| | | | | |
|---|---|---|---|---|
| 4,949,207 | A | * | 8/1990 | Lazzari .................... 360/125.34 |
| 5,274,521 | A | * | 12/1993 | Miyauchi et al. ........ 360/119.06 |
| 5,408,373 | A | * | 4/1995 | Bajorek et al. ............. 360/244.3 |
| 5,742,452 | A | * | 4/1998 | Simmons et al. .......... 360/246.1 |
| 5,920,762 | A | * | 7/1999 | Simmons et al. .................. 438/3 |
| 6,925,702 | B2 | * | 8/2005 | Krounbi et al. ............. 29/603.14 |
| 7,365,943 | B2 | * | 4/2008 | Yamakawa et al. ...... 360/125.33 |
| 7,464,457 | B2 | * | 12/2008 | Le et al. ..................... 29/603.16 |
| 2002/0093761 | A1 | * | 7/2002 | Payne et al. .................... 360/125 |
| 2005/0243463 | A1 | * | 11/2005 | Fontana et al. ................ 360/126 |

* cited by examiner

*Primary Examiner* — Will J Klimowicz
(74) *Attorney, Agent, or Firm* — Hall Estill Attoneys at Law (57) ABSTRACT

Provided is a vertical magnetic recording head having a main pole, a return yoke, and a coil, all of which are formed on a substrate, and a method of manufacturing the same. The main pole includes a vertical portion which is vertical to the substrate, a horizontal portion that connects a lower part of the vertical portion to the return yoke, and a main pole tip formed on the vertical portion of the main pole. The main pole tip has a conical shape vertical to the substrate.

16 Claims, 10 Drawing Sheets

MAGNETIC RECORDING HEAD COMPRISING CONICAL MAIN POLE TIP AND METHOD OF MANUFACTURING THE SAME

CROSS-REFERENCE TO RELATED PATENT APPLICATION

This application claims the benefit of Korean Patent Application No. 10-2007-0104474, filed on Oct. 17, 2007, in the Korean Intellectual Property Office, the disclosure of which is incorporated herein in its entirety by reference.

BACKGROUND OF THE INVENTION

1. Field of the Invention

The present invention relates to a magnetic recording head and a method of manufacturing the same, and more particularly, to a magnetic recording head comprising a conical main pole tip and a method of manufacturing the same.

2. Description of the Related Art

Magnetic recording may be largely classified into a horizontal magnetic recording method and a vertical magnetic recording method. In the horizontal magnetic recording method, information is recorded using a characteristic that the magnetization direction of a magnetic layer is in parallel to a surface of the magnetic layer, and in the vertical magnetic recording method, information is recorded using a characteristic that the magnetization direction of a magnetic layer is perpendicular to a surface of the magnetic layer. In terms of recording density, the vertical magnetic recording method provides a higher recording density than the horizontal magnetic recording method, and thus, various structures of vertical magnetic recording heads have been developed.

An advantage of the vertical magnetic recording method is a supply of a strong magnetic field to a medium using a main pole which has a single pole structure and a soft magnetic under layer of the medium. In order to increase the recording density, a main pole tip of the main pole of a vertical recording head is manufactured to be small.

However, when the size of the main pole tip is decreased, it is difficult to accurately control the shape of the main pole tip, and also, in a planarization process for forming the recording head to have a width (a width of a return yoke) of approximately 0.5 μm, yield may be reduced and the manufacturing process may be complicated.

SUMMARY OF THE INVENTION

To address the above and/or other problems, the present invention provides a magnetic recording head having a conical main pole tip that may be used in a high density recording medium.

The present invention also provides a method of manufacturing a magnetic recording head having a conical main pole tip.

According to an aspect of the present invention, there is provided a vertical magnetic recording head comprising a main pole, a return yoke, and a coil, all of which are formed on a substrate, wherein the main pole comprises a vertical portion that is vertical to the substrate, a horizontal portion that connects a lower portion of the vertical portion to the return yoke, and a main pole tip formed on the vertical portion. The main pole tip has a conical shape formed vertically to the substrate.

The coil may be a solenoid type coil that surrounds the horizontal portion of the main pole or may be formed to surround the vertical portion of the main pole.

The vertical portion of the main pole may be formed in multiple layers.

The main pole tip may have a pyramid shape.

The vertical portion of the main pole may comprise a multiple layer structure.

According to an aspect of the present invention, there is provided a method of manufacturing a vertical magnetic recording head comprising: (a) forming a lower coil layer on a substrate; (b) forming a horizontal portion of a main pole above the lower coil layer; (c) forming a first insulating layer on the horizontal portion of the main pole; (d) forming first holes that expose both ends of the horizontal portion of the main pole and second holes for interconnecting the lower coil layer in the first insulating layer; (e) forming an upper coil layer connected to the lower coil layer through the second hole on the first insulating layer; (f) forming a vertical portion of the main pole and a vertical portion of the return yoke in the first holes to protrude above the first insulating layer; (g) forming a conical main pole tip on the vertical portion of the main pole; and (h) forming a horizontal portion of the return yoke between the main pole tip and the vertical portion of the return yoke.

The forming of the vertical portion of the main pole and the vertical portion of the return yoke may further comprise forming a second insulating layer covering laterals of the vertical portions.

The forming of the conical main pole tip may comprise: stacking a sacrificial layer and a metal layer on the second insulating layer; forming a third hole and a fourth hole respectively in the sacrificial layer and the metal layer, respectively; and forming the conical main pole tip by sputtering or E-beam depositing a magnetic material through the third hole and the fourth hole from above the metal layer.

The forming of the conical main pole tip may comprise: forming a magnetic material layer on the second insulating layer; forming a mask on the magnetic material layer; and forming the conical main pole tip by wet-etching the magnetic material layer exposed by the mask.

The mask may have a rectangular shape and the main pole tip may have a pyramid shape.

The forming of the conical main pole tip may comprise: forming a photoresist layer on the second insulating layer; forming a hole having a truncated conical shape in a region of the photoresist layer corresponding to the vertical portion of the main pole; and forming the conical main pole tip by sputtering or E-beam depositing a magnetic material from above the photoresist layer.

The forming of the horizontal portion may further comprise: forming a third insulating layer covering the main pole tip; and forming the horizontal portion of the return yoke to make a gap between the main pole tip and the horizontal portion of the return yoke.

The forming of the vertical portion of the main pole may comprise forming the vertical portion of the main pole to have multiple layers.

According to another aspect of the present invention, there is provided a method of manufacturing a vertical magnetic recording head comprising: (a) forming a horizontal portion of a main pole on a substrate; (b) forming a first insulating layer on the horizontal portion of the main pole; (c) forming first holes that exposes both ends of the horizontal portion of the first insulating layer; (d) forming a vertical portion of the main pole and a vertical portion of the return yoke in the first holes to protrude above the first insulating layer; (e) forming a coil layer on the first insulating layer; (f) forming a second insulating layer on the first insulating layer covering laterals of the vertical portion of the main pole and the vertical portion of the return yoke; (g) forming a conical main pole tip on the vertical portion of the main pole; and (h) forming a horizontal portion of the return yoke between the conical main pole tip and the vertical portion of the return yoke.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

A vertical magnetic recording head having a conical main pole tip and a method of manufacturing the same according to the present invention will now be described more fully with reference to the accompanying drawings in which exemplary embodiments of the invention are shown. In the drawings, the thicknesses of layers and regions are exaggerated for clarity, and like reference numerals refer to the like elements.

Figure 1:
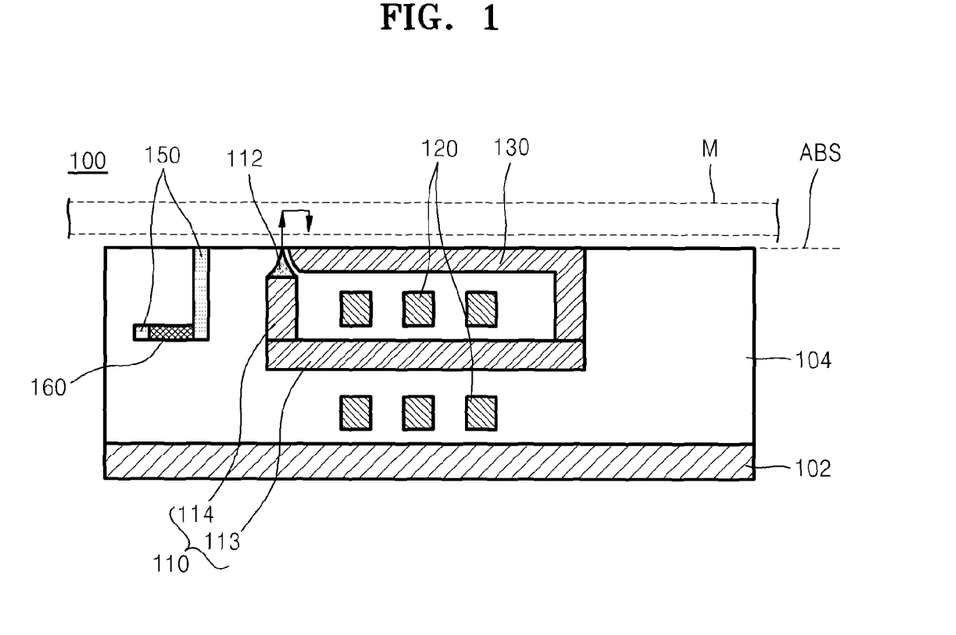
FIG. 1 is a schematic cross-sectional view of a vertical magnetic recording head according to an embodiment of the present invention.

FIG. 1 is a schematic cross-sectional view of a vertical magnetic recording head 100 according to an embodiment of the present invention.

Referring to FIG. 1, in order to record information on a recording medium M, the vertical magnetic recording head 100 includes a recording head unit that includes a main pole 110 that applies a magnetic field to the recording medium M, a coil 120 to which a current for generating the magnetic field is applied, and a return yoke 130 that forms a magnetic path together with the main pole 110. A main pole tip 112 having a conical shape is formed on an end of the main pole 110. Also, in order to read information recorded on the recording medium M, the vertical magnetic recording head 100 further includes a reproducing head unit consisting of two magnetic shields 150 and a magnetic resistance device 160 interposed between the two magnetic shields 150. The recording head unit and the reproducing head unit are formed on an insulating layer 104 on a substrate 102. The insulating layer 104 may be a stack structure formed of a plurality of insulating layers stacked in manufacturing processes.

The substrate 102 may be a Si substrate or an AlTiC substrate. A plurality of magnetic recording heads are formed on the substrate 102, and when the magnetic recording heads are diced with the substrate 102, individual vertical magnetic recording head such as the vertical magnetic recording head 100 are formed.

The insulating layer 104 may be formed of an insulating material such as $Al_2O_3$, $SiO_2$, or $Si_3N_4$.

The main pole 110 and the return yoke 130 may be formed of a magnetic material, for example, CoFe, NiFe, or CoNiFe so as to form a magnetic path of a recording magnetic field generated by the coil 120.

The main pole 110 includes a horizontal portion 113 formed parallel to the substrate 102 and a vertical portion 114 formed vertical to the substrate 102. The vertical portion 114 may have a stack structure consisting of multiple layers. A magnetic domain is formed parallel to the layers of the stack structure of the vertical portion 114 of the main pole 110, and thus, an erasing characteristic of the vertical magnetic recording head 100 is improved.

The coil 120 generates a recording magnetic field, and may be a solenoid type coil that surrounds the horizontal portion 113 of the main pole 110.

A gap is formed between the return yoke 130 and the recording medium M, and the gap is appropriately formed so that a magnetic field generated from the main pole 110 may form a return path after the magnetic field magnetizes the recording medium M in a vertical direction. The gap may be approximately 500 nm or less.

The magnetic resistance device 160 may be a GMR or a TMR. The magnetic resistance device 160 is formed separate to a surface of an air bearing system (ABS).

In the vertical magnetic recording head 100 according to the present embodiment, since the main pole tip 112 has a very small diameter, magnetic flux may be concentrated on the main pole tip 112, and thus, the main pole tip 112 may magnetize a small area of the recording medium M, thereby increasing the recording density of the recording medium M. Also, the main pole tip 112 may be applied to a recording medium that includes a nano-dot recording area.

The vertical portion 114 of the main pole 110 may have a cylindrical shape, which facilitates the transmission of the magnetic flux.

The main pole tip 112 may have a conical shape as depicted in FIG. 1; however, the shape of the main pole tip 112 is not limited thereto. That is, the main pole tip 112 may be formed in various shapes such as a rectangular column. In particular, the main pole tip 112 having a rectangular column shape may form a high density magnetization since the main pole tip 112 may have a long rectangular shape in a direction vertical to the recording medium M.

The structure of the vertical magnetic recording head 100 according to the present embodiment will be explained in detail through a manufacturing process which is described below.

The method of manufacturing the vertical magnetic recording head 100 will now be described. FIGS. 2A through 2I are cross-sectional views for explaining a method of manufacturing the vertical magnetic recording head 100, according to an embodiment of the present invention.

Figure 2A:
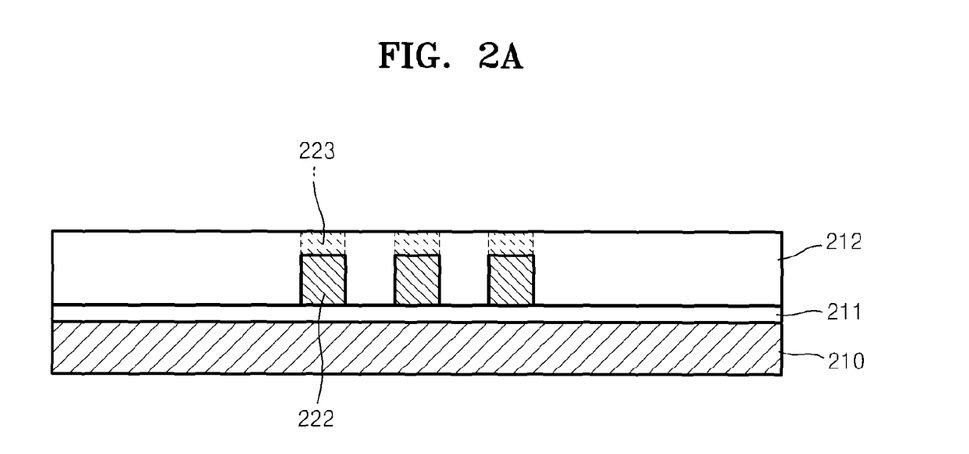
FIGS. 2A through 2I are cross-sectional views for explaining a method of manufacturing a vertical magnetic recording head, according to an embodiment of the present invention.

Referring to FIG. 2A, a first insulating layer 211 is formed on a substrate 210, and a lower coil layer 222 is formed on the first insulating layer 211. An interconnection part 223 for connecting the lower coil layer 222 to an upper coil layer which will be formed later is formed on an end of the lower coil layer 222. The forming of the lower coil layer 222 and the interconnection part 223 may be achieved by using a photoresist (PR) pattern (not shown) and a Cu plating process.

After removing the PR pattern, a second insulating layer 212 covering the lower coil layer 222 is formed on the first insulating layer 211. The first insulating layer 211 and the second insulating layer 212 may be formed by depositing an insulating material such as $Al_2O_3$, $SiO_2$, or $Si_3N_4$ on the substrate 210.

The interconnection part 223 is exposed by planarizing the second insulating layer 212 using a chemical mechanical polishing (CMP) process.

Figure 2B:
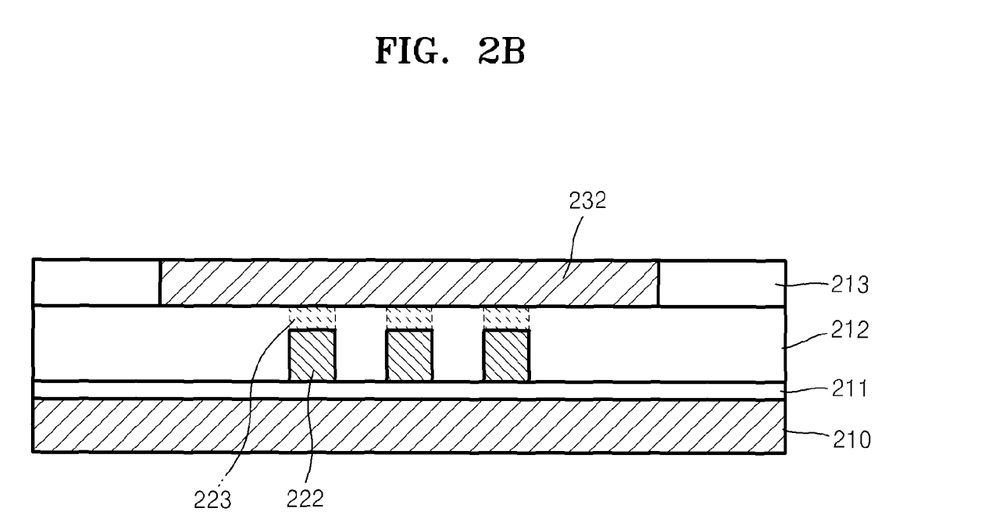

Referring to FIG. 2B, a horizontal portion 232 of a main pole is formed on the second insulating layer 212. The horizontal portion 232 may be formed by depositing or plating a magnetic material such as CoFe, NiFe, or CoNiFe on the second insulating layer 212. For example, after forming a PR pattern (not shown) on the second insulating layer 212, the horizontal portion 232 may be formed using a plating process. Next, a third insulating layer 213 covering the horizontal portion 232 is formed on the second insulating layer 212, and the horizontal portion 232 is exposed by planarizing the third insulating layer 213.

Figure 2C:
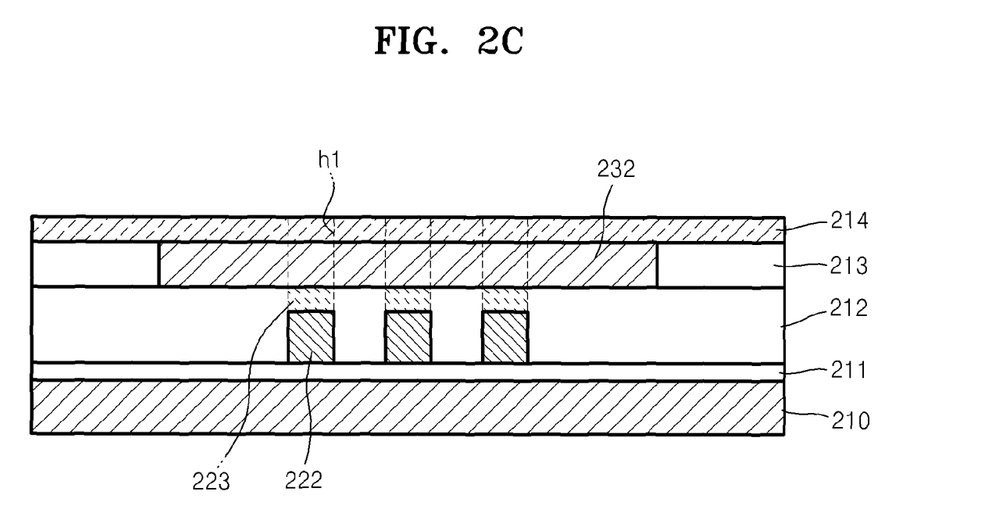

Referring to FIG. 2C, a fourth insulating layer 214 is formed on the third insulating layer 213. First holes h1 that expose the upper part of the interconnection parts 223 are formed in the third and fourth insulating layers 213 and 214.

Figure 2D:
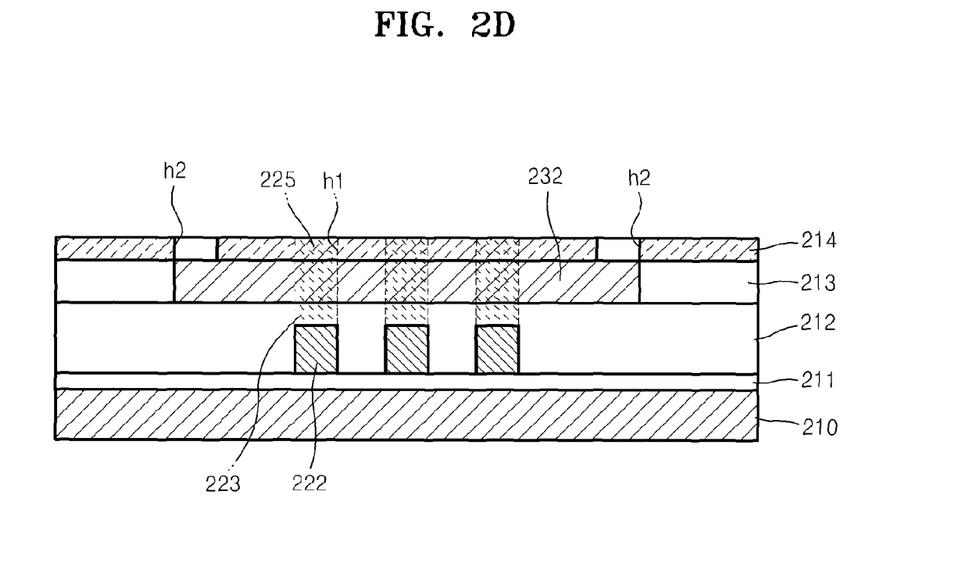

Referring to FIG. 2D, second connection parts 225 are formed in the first holes h1 by filling Cu in the first holes h1 by using a plating process, and thus, the second connection parts 225 are connected to the interconnection parts 223. Second holes h2 that expose both ends of the horizontal portion 232 are formed in the fourth insulating layer 214. The first and second holes h1 and h2 may be formed using a conventional patterning process, and thus, a detailed description thereof will be omitted.

Figure 2E:
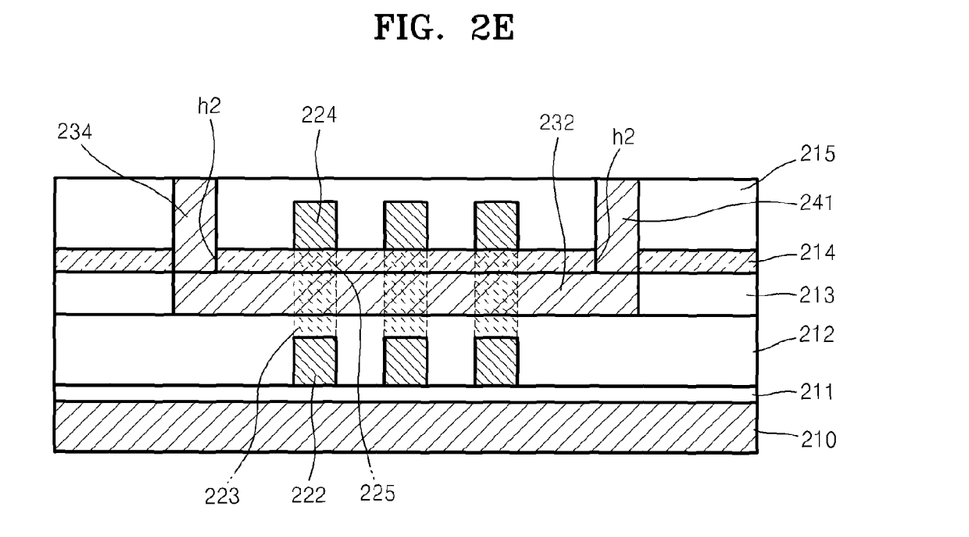

Referring to FIG. 2E, an upper coil layer 224 to be connected to the second connection part 225 is formed on the fourth insulating layer 214 using a plating process or a sputtering process.

A vertical portion 234 of the main pole and a first portion 241 of a return yoke are formed by plating or sputtering a magnetic material in the second hole h2. At this point, a plurality of magnetic domain walls may be formed in the vertical portion 234 of the main pole by stacking magnetic materials in multiple layers in the second hole h2, and thus, the erasing characteristic of the vertical magnetic recording head 100 may be improved.

A fifth insulating layer 215 is formed on the fourth insulating layer 214, and upper surfaces of the vertical portion 234 of the main pole and the first portion 241 of the return yoke are exposed by planarizing the fifth insulating layer 215. The vertical portion 234 of the main pole may be formed as a rectangular column shape or a cylindrical shape as the shape of the second hole h2 and a PR pattern (not shown) on the fourth insulating layer 214.

The two magnetic shields 150 and the magnetic resistance device 160 of FIG. 1 may be formed in the fourth insulating layer 214 and the fifth insulating layer 215 together in the process of forming the upper coil layer 224, the vertical portion 234 of the main pole, and the first portion 241 of the return yoke. That is, after a hole for forming the magnetic resistance device 160 and a hole for forming the two magnetic shields 150 are respectively formed in the fourth insulating layer 214, a magnetic material for forming the two magnetic shields 150 and a magnetic material for forming the magnetic resistance device 160 may be formed in the respective hole. At this point, the two magnetic shields 150 may be formed to be higher than the ABS (referring to FIG. 1) surface using a plating process or a sputtering process.

Figure 2F:
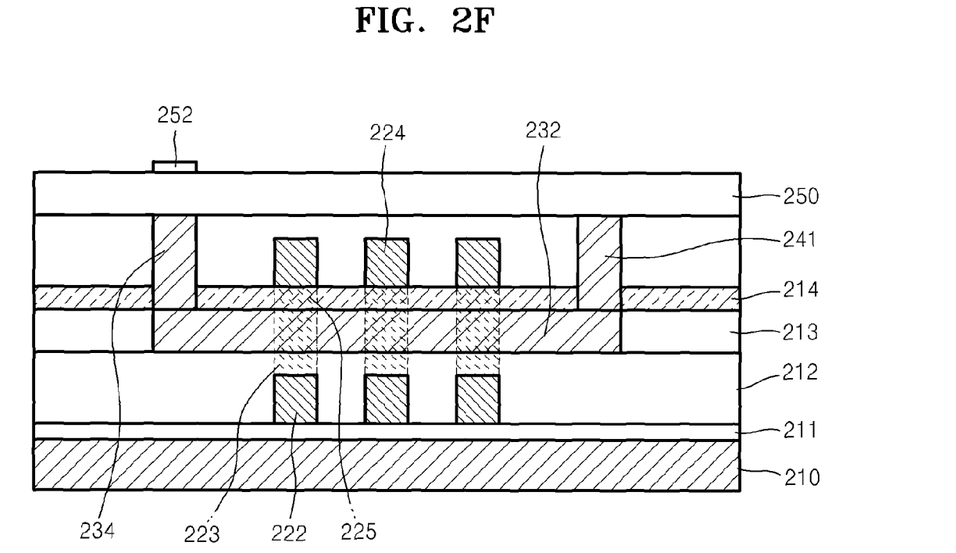

Referring to FIG. 2F, a magnetic film 250, for example, a CoFe film is formed on the fifth insulating layer 215. A circular mask 252 is formed on a region of the magnetic film 250 corresponding to the vertical portion 234 of the main pole.

Figure 2G:
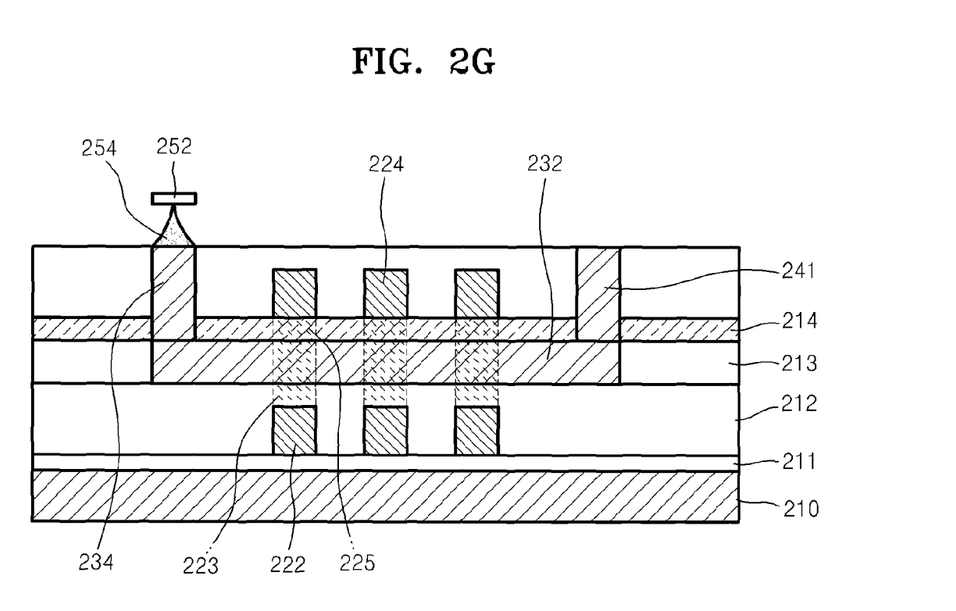

Referring to FIG. 2G, the magnetic film 250 exposed by the circular mask 252 is wet-etched and a main pole tip 254 having a conical shape is formed below the circular mask 252.

Figure 2H:
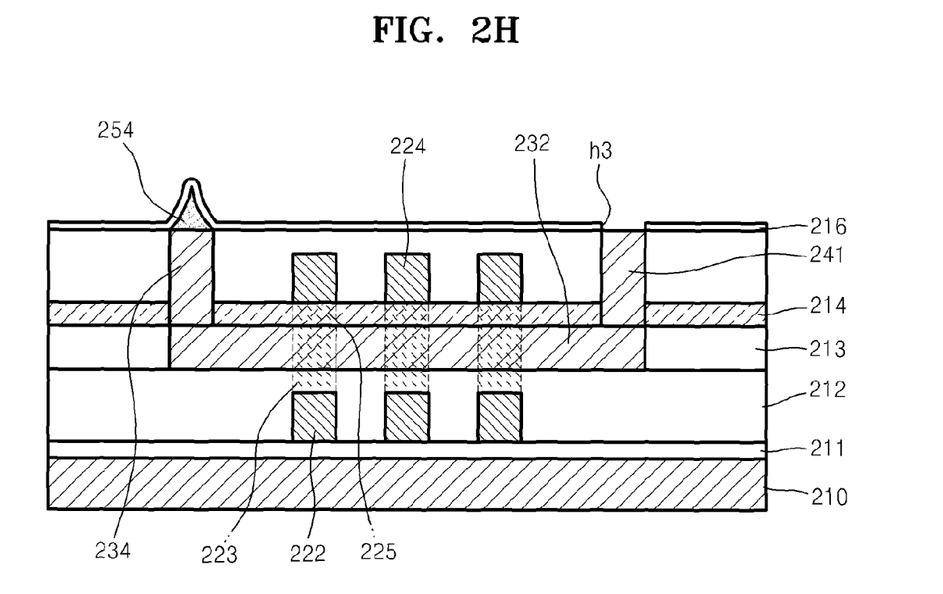

Referring to FIG. 2H, the circular mask 252 is removed, and a sixth insulating layer 216 for forming a gap between the main pole tip 254 and the return yoke (referring to 130 in FIG. 1) is deposited on the fifth insulating layer 215. The sixth insulating layer 216 may be formed of an insulating material such as $Al_2O_3$, $SiO_2$, $Si_3N_4$ to a thickness of 100 to 1000 Å using an atomic layer deposition (ALD) process, a sputtering process, or a chemical vapor deposition (CVD) process.

A third hole h3 that exposes the first portion 241 of the return yoke is formed in the sixth insulating layer 216.

Figure 2I:
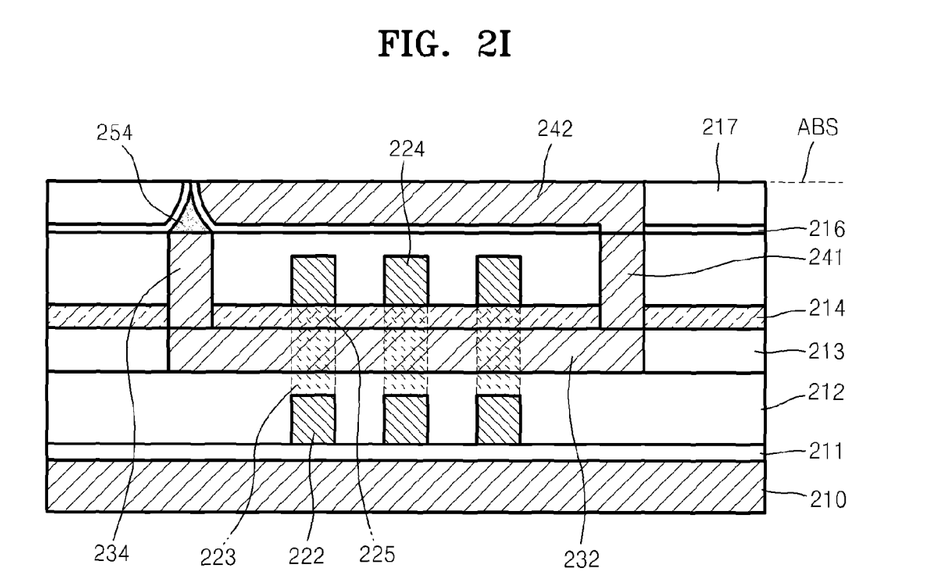

Referring to FIG. 2I, a second portion 242 of the return yoke is formed in the third hole h3 and on the sixth insulating layer 216 using a plating process or a sputtering process.

After forming a seventh insulating layer 217 covering the second portion 242 of the return yoke on the sixth insulating layer 216, the second portion 242 of the return yoke is exposed by planarizing the seventh insulating layer 217. In this process, the ABS surface may be formed.

In the method of manufacturing the vertical magnetic recording head 100 according to the current embodiment of the present invention, a height of the main pole tip 254 may be controlled using the thin film deposition process, and also, the thickness of the return yoke at a portion that contacts the ABS surface may be readily controlled, thereby increasing yield in terms of a manufacturing process.

Also, the shape of the main pole tip 254 may be easily determined by the shape of the mask used in the etching process for forming the main pole tip. Also, magnetic flux may be concentrated in a small region since the main pole tip 254 is formed in a tapered shape, and thus, the main pole tip 254 may be readily applied to a recording medium in which information is recorded in nano-dots.

Figure 3:
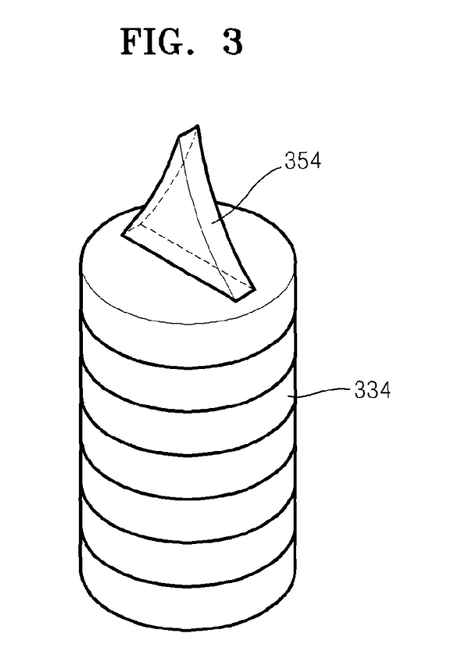
FIG. 3 is a perspective view of a portion of a main pole according to an embodiment of the present invention.

FIG. 3 is a perspective view of a portion of a main pole according to another embodiment of the present invention. A method of manufacturing the main pole according to another embodiment of the present invention will now be described with reference to the method described above.

Referring to FIG. 3, the main pole comprises a vertical portion 334 and a main pole tip 354. The vertical portion 334 may be formed as a stack structure which may be formed by sequentially depositing magnetic materials with time gaps.

Also, the vertical portion 334 of the main pole may have a cylindrical shape. The cylindrical shape of the vertical portion 334 is determined by the shape of the second hole h2 (referring to FIG. 2D) formed in the fourth insulating layer 214 and a photoresist pattern (not shown) on the fourth insulating layer 214 (referring to FIG. 2D), and may also be formed as different shapes.

The main pole tip 354 has a pyramid shape. The main pole tip 354 having the pyramid shape may be formed by using a rectangular mask 252 on the magnetic film 250. In particular, since the main pole tip 354 has a long rectangular bottom shape in a direction perpendicular to a track direction, that is, in a direction perpendicular to a lengthwise direction of the second portion 242 of the return yoke, thereby forming a high density magnetization.

Figure 4A:
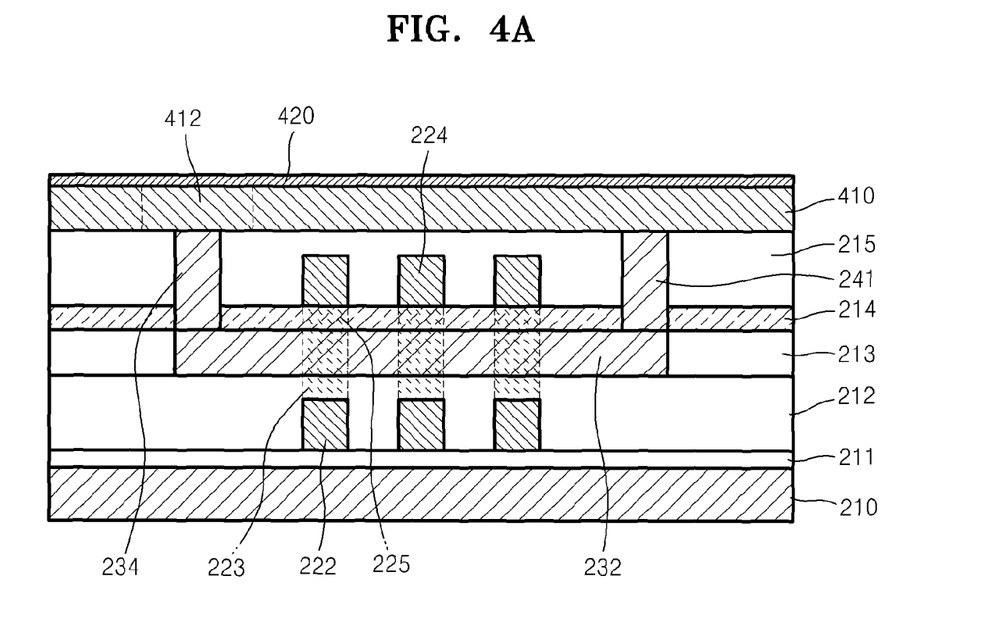
FIGS. 4A through 4C are cross-sectional views for explaining a method of manufacturing a main pole tip, according to an embodiment of the present invention.
Figure 4B:
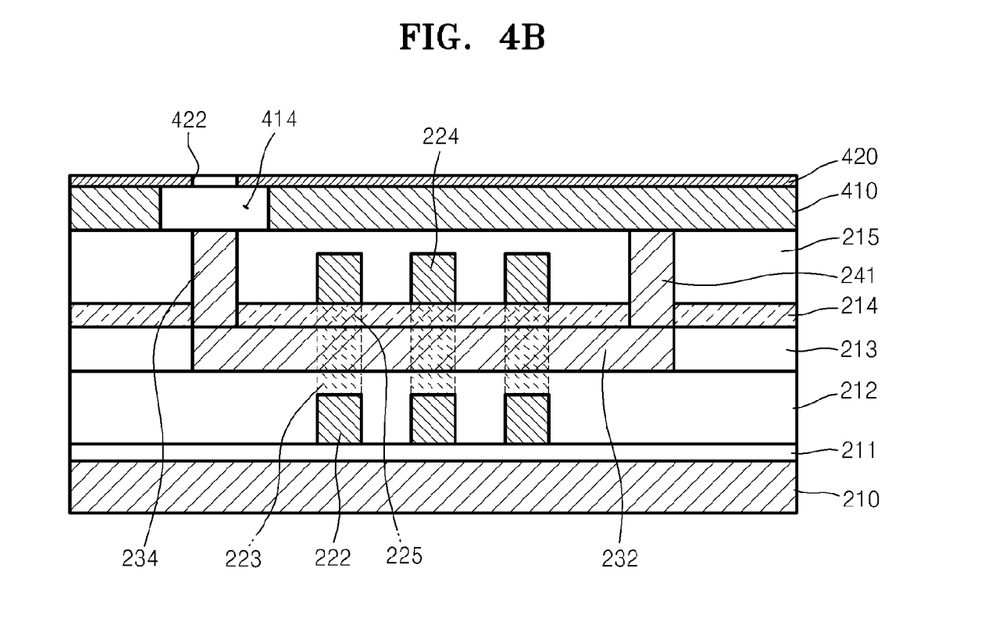
Figure 4C:
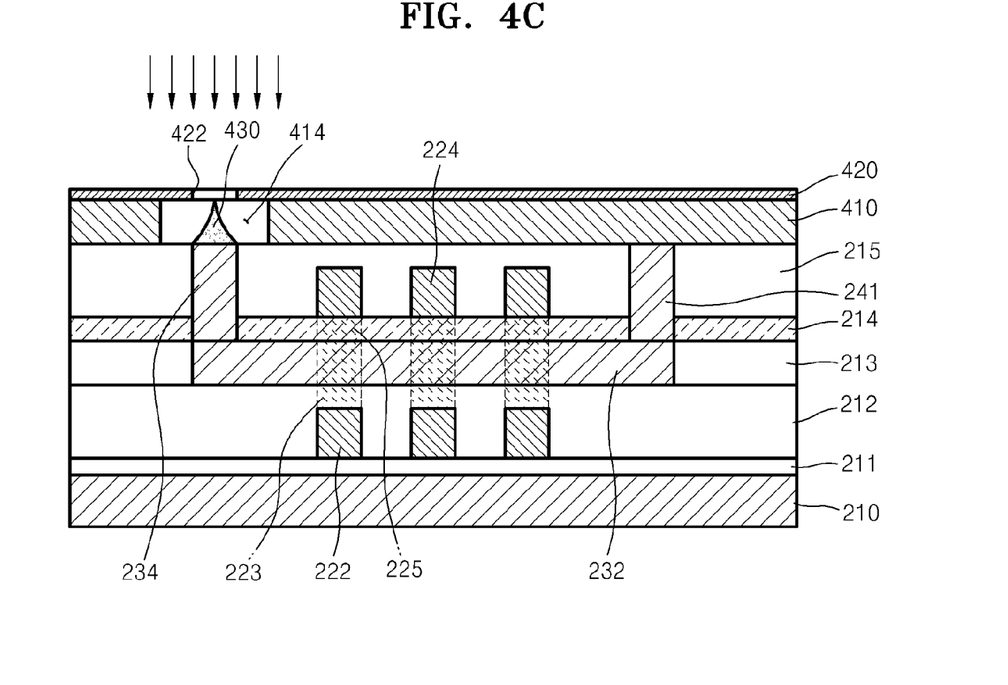

FIGS. 4A through 4C are cross-sectional views for explaining a method of manufacturing a main pole tip, according to still another embodiment of the present invention. The method of manufacturing the main pole tip according to the present embodiment will be described with reference to FIGS. 4A through 4C; however, the method will be mainly described with regards to parts different from the method in FIGS. 2A through 2I by referring to the method illustrated in FIGS. 2A through 2I.

Referring to FIG. 4A, a sacrificial layer 410 having a height corresponding to the height of the main pole tip is formed on the fifth insulating layer 215 using a positive photoresist, for example, polymethyl methacrylate (PMMA). Next, light is irradiated onto a first region 412 of the sacrificial layer 410 that corresponds to the region of the vertical portion 234 of the main pole, wherein the first region 412 has a diameter greater than that of the vertical portion 234 of the main pole. Next, a metal layer 420 formed of, for example, Cr or Mo is formed on the sacrificial layer 410.

Referring to FIG. 4B, a fourth hole 422 is formed in the metal layer 420 by etching a portion of the metal layer 420 corresponding to the vertical portion 234 of the main pole.

Next, a fifth hole 414 is formed by developing the first region 412.

Referring to FIG. 4C, a main pole tip 430 having a conical shape is formed on the vertical portion 234 of the main pole by depositing a magnetic material such as CoFe, NiFe, or CoNiFe from above the metal layer 420 using sputtering or electron beam deposition. Next, the sacrificial layer 410 is removed. Subsequent processes are the same as the manufacturing processes described with reference to FIGS. 2H and 2I.

Figure 5:
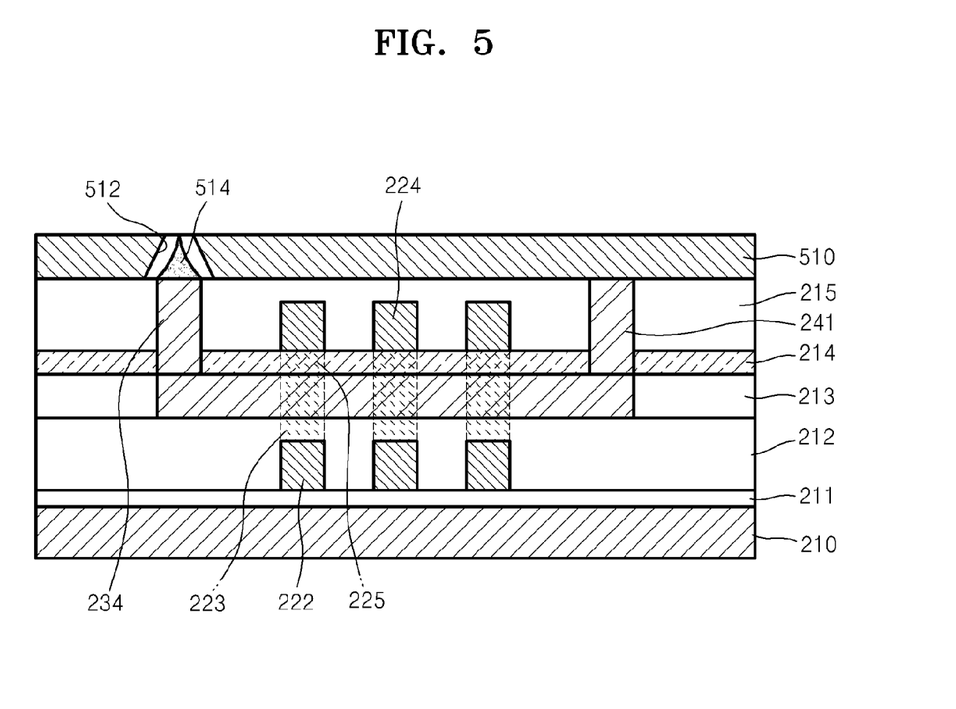
FIG. 5 is a cross-sectional view for explaining a method of manufacturing a main pole tip, according to another embodiment of the present invention.

FIG. 5 is a cross-sectional view for illustrating a method of manufacturing a main pole tip according to still another embodiment of the present invention. The method of manufacturing the main pole tip according to the present embodiment will be described with reference to FIG. 5, however, the method will be mainly described with regards to parts different from the method described with reference to FIGS. 2A through 2I.

Referring to FIG. 5, a sacrificial layer 510 having a height corresponding to the height of the main pole tip 254 is formed on the fifth insulating layer 215 using a positive photoresist, for example, polymethyl methacrylate (PMMA). Next, a hole 512 having a conical shape is formed in a region in the sacrificial layer 510 corresponding to the vertical portion 234 of the main pole. After ultraviolet rays are obliquely irradiated onto the region of the sacrificial layer 510, the truncated conical shape of the hole 512 may be formed by developing the region of the sacrificial layer 510.

A main pole tip 514 having a conical shape is formed on the vertical portion 234 of the main pole by depositing a magnetic material such as CoFe, NiFe, or CoNiFe from above the sacrificial layer 510 using sputtering or electron beam deposition. Next, the sacrificial layer 510 is removed. Subsequent processes are the same as the manufacturing processes described with reference to FIGS. 2H and 2I.

Figure 6:
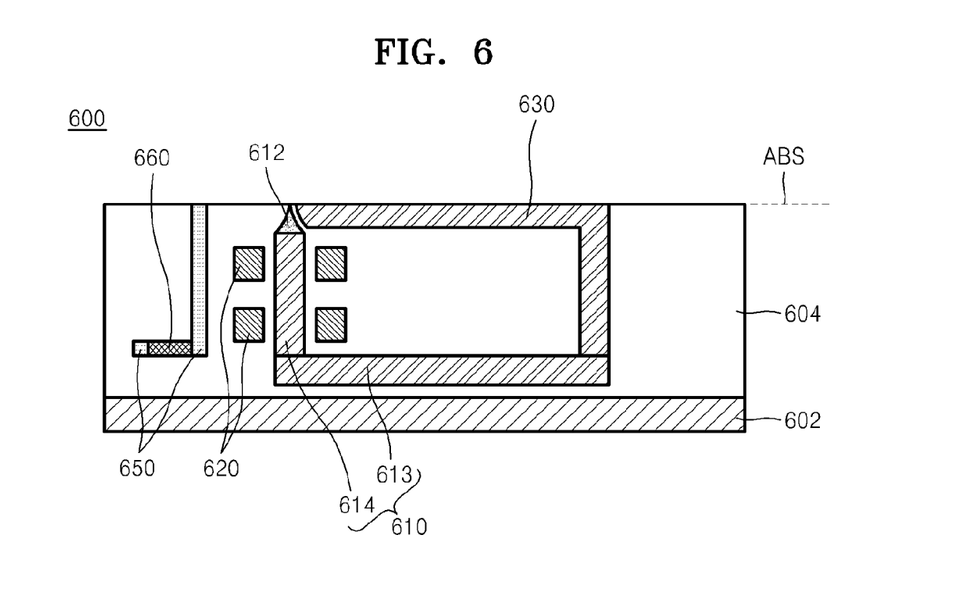
FIG. 6 is a schematic cross-sectional view of a vertical magnetic recording head according to another embodiment of the present invention.

FIG. 6 is a cross-sectional view of a vertical magnetic recording head 600 according to still another embodiment of the present invention. Referring to FIG. 6, in order to record information, the vertical magnetic recording head 600 according to the current embodiment of the present invention includes a recording head unit comprising a main pole 610 that applies a magnetic field to a recording medium, a coil 620 to which a current for generating the magnetic field is applied, and a return yoke 630 that forms a magnetic path of the magnetic field together with the main pole 610. A main pole tip 612 having a conical shape is formed on an end of the main pole 610. Also, in order to read information recorded on the recording medium, the vertical magnetic recording head 600 further includes a reproducing head unit that includes two magnetic shields 650 and a magnetic resistance device 660 interposed between the two magnetic shields 650. The recording head unit and the reproducing head unit are formed on an insulating layer 604 on a substrate 602. The insulating layer 604 may be a stacking structure formed of a plurality of insulating layers stacked in manufacturing processes.

The main pole 610 and the return yoke 630 may be formed of a magnetic material, for example, CoFe, NiFe, or CoNiFe so as to form a magnetic path of a recording magnetic field generated by the coil 620.

The main pole 610 includes a horizontal portion 613 formed parallel to the substrate 602 and a vertical portion 614 formed vertical to the substrate 602. The vertical portion 614 may have a stack structure consisting of multiple layers. A magnetic domain is formed parallel to the layers of the stack structure of the vertical portion 614 of the main pole 610, and thus, an erasing characteristic of the vertical magnetic recording head 600 is improved.

The coil 620 generates a recording magnetic field, and surrounds the vertical portion 614 of the main pole 610. The coil 620 may be formed to have a multiple layer structure.

A gap is formed between the main pole 610 and the return yoke 630, and the gap is appropriately formed so that a magnetic field generated from the main pole 610 may form a return path after the magnetic field magnetizes the recording medium in a vertical direction. The gap may be approximately 500 nm or less.

The magnetic resistance device 660 may be a giant magneto resistance (GMR) device or a tunnel magneto resistance (TMR) device. The magnetic resistance device 660 is separately formed from a surface of an air bearing system (ABS).

In the vertical magnetic recording head 600 according to the current embodiment of the present invention, since the main pole tip 612 has a very small diameter, magnetic flux may be concentrated on the main pole tip 612, and thus, the main pole tip 612 may magnetize a small area of the recording medium, thereby increasing the recording density of the recording medium. Also, the main pole tip 612 may be applied to a recording medium that includes a nano-dot recording area.

The vertical portion 614 of the main pole 610 may have a cylindrical shape, and the vertical portion 614 facilitates the transmission of the magnetic flux.

The structure of the vertical magnetic recording head 600 according to the current embodiment of the present invention is explained in detail through a manufacturing process below.

The method of manufacturing the vertical magnetic recording head 600 will now be described. FIGS. 7A through 7D are cross-sectional views for illustrating a method of manufacturing the vertical magnetic recording head 600 according to the present embodiment.

Figure 7A:
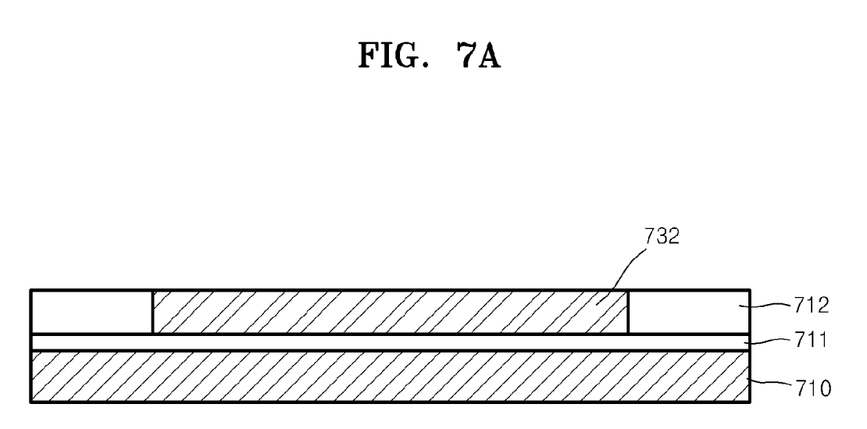
FIGS. 7A through 7D are cross-sectional views for explaining a method of manufacturing a vertical magnetic recording head, according to another embodiment of the present invention.

Referring to FIG. 7A, after forming a first insulating layer 711 on a substrate 710, a horizontal portion 732 of a main pole is formed on the first insulating layer 711. The horizontal portion 732 may be formed by depositing or plating a magnetic material such as CoFe, NiFe, or CoNiFe. For example, after forming a PR pattern (not shown) on the first insulating layer 711, the horizontal portion 732 is formed using a plating process. Next, a second insulating layer 712 covering the horizontal portion 732 is formed on the first insulating layer 711, and then, the horizontal portion 732 is exposed by planarizing the second insulating layer 712. The first and second insulating layers 711 and 712 may be formed by depositing an insulating material such as $Al_2O_3$, $SiO_2$, or $Si_3N_4$.

Figure 7B:
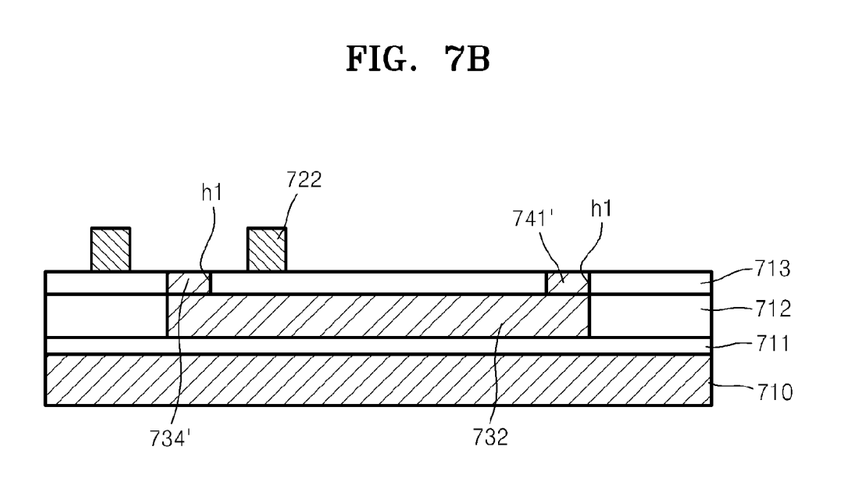

Referring to FIG. 7B, a third insulating layer 713 is formed on the second insulating layer 712. First hole h1 is formed in regions of the third insulating layer 713 corresponding to both ends of the horizontal portion 732. A portion 734' of a vertical portion of a main pole and a portion 741' of a first portion of a return yoke are formed by filling the first hole h1 with a magnetic material.

A first coil layer 722 is formed on the third insulating layer 713. The first coil layer 722 may be formed using a photoresist (PR) pattern (not shown) and a Cu plating process.

Figure 7C:
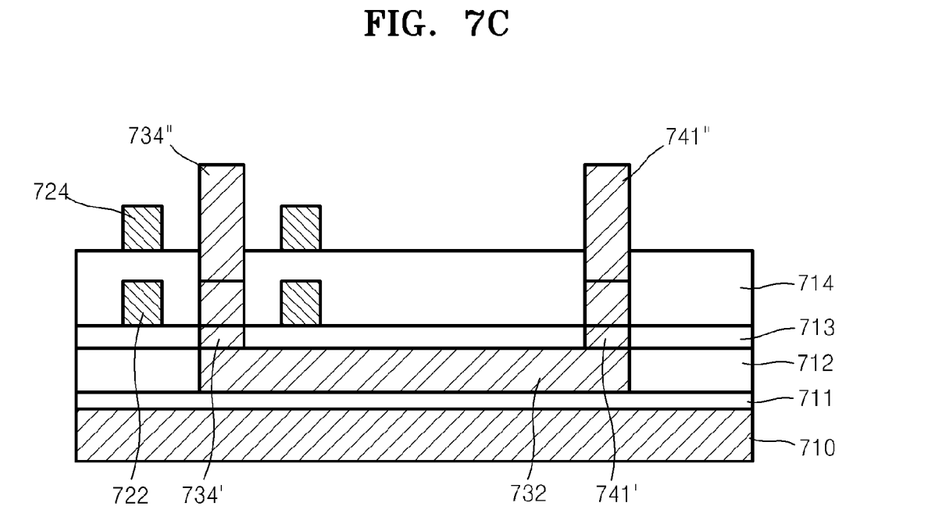

Referring to FIG. 7C, a remaining portion 734" of the vertical portion of the main pole and a remaining portion 741" of the first portion of the return yoke may be formed respectively on the portion 743' of vertical portion of the main pole and the portion 741' of the first portion of the return yoke. The vertical portion of the main pole and the first portion of the return yoke may be formed in a stack structure.

Next, a fourth insulating layer 714 covering the first coil layer 722 is formed on the third insulating layer 713. A second coil layer 724 is formed on the fourth insulating layer 714. In FIG. 7C, the coil layer is formed to have a multiple layer structure; however, the present invention is not limited thereto. Each of the first and second coil layers 722 and 724 may be wound several times as in a spiral type coil.

The two magnetic shields 650 and the magnetic resistance device 660 of FIG. 6 may be formed together in the process of forming the second coil layer 714 on the fourth insulating layer 714. That is, a pattern for forming the magnetic resistance device 660 and a pattern for forming the two magnetic shields 650 are respectively formed in the fourth insulating layer 714, and a material for forming the magnetic resistance device 660 and a magnetic material for forming the two magnetic shields 650 may be formed respectively in each of the patterns. The two magnetic shields 650 may be formed to be higher than the ABS surface using a plating process or a sputtering process.

Figure 7D:
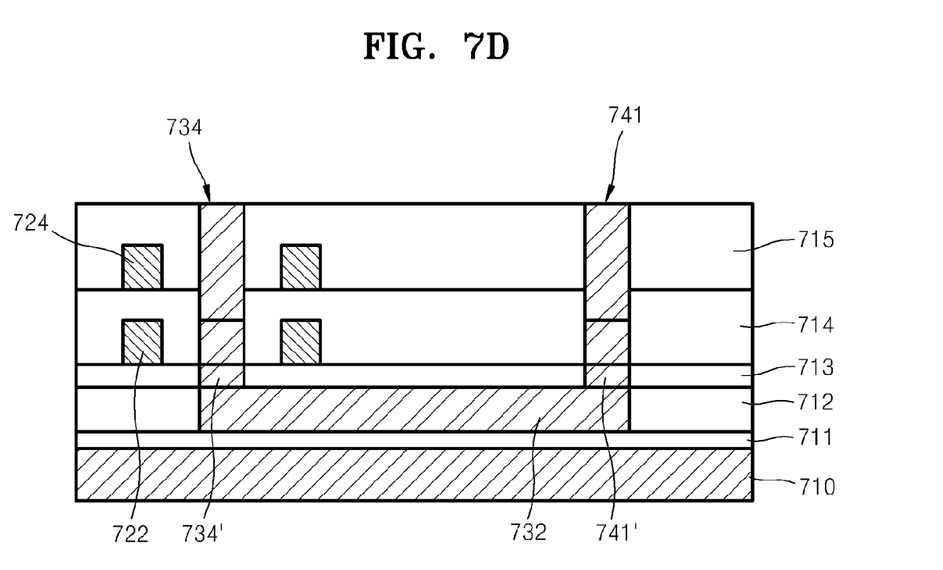

Referring to FIG. 7D, a fifth insulating layer 715 covering the remaining portion 734" of the vertical portion of the main pole and the remaining portion 741" of the first portion of the return yoke is formed on the fourth insulating layer 714. Afterwards, a vertical portion 734 of the main pole and a first portion of the return yoke are exposed by planarizing the fifth insulating layer 715.

Subsequent processes are substantially the same as the processes described with reference to FIGS. 2F through 2I, and thus, the description thereof will not be repeated. The methods described with reference to FIGS. 4A through 4C and FIG. 5 may also be applied to the present embodiment, and thus, the detailed description thereof will not be repeated.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing a vertical magnetic recording head comprising:
    (a) forming a lower coil layer on a substrate;
    (b) forming a horizontal portion of a main pole above the lower coil layer;
    (c) forming a first insulating layer on the horizontal portion of the main pole;
    (d) forming first holes that expose both ends of the horizontal portion of the main pole and second holes for interconnecting the lower coil layer in the first insulating layer;
    (e) forming an upper coil layer connected to the lower coil layer through the second hole on the first insulating layer;
    (f) forming a vertical portion of the main pole and a vertical portion of a return yoke in the first holes to protrude above the first insulating layer;
    (g) forming a conical main pole tip on the vertical portion of the main pole; and
    (h) forming a horizontal portion of the return yoke between the main pole tip and the vertical portion of the return yoke.

2. The method of claim 1, wherein the forming of the vertical portion of the main pole and the vertical portion of the return yoke further comprises forming a second insulating layer covering laterals of the vertical portions.

3. The method of claim 2, wherein the forming of the conical main pole tip comprises:
    stacking a sacrificial layer and a metal layer on the second insulating layer;
    forming a third hole and a fourth hole respectively in the sacrificial layer and the metal layer, respectively; and
    forming the conical main pole tip by sputtering or E-beam depositing a magnetic material through the third hole and the fourth hole from above the metal layer.

4. The method of claim 2, wherein the forming of the conical main pole tip comprises:
    forming a magnetic material layer on the second insulating layer;
    forming a mask on the magnetic material layer; and
    forming the conical main pole tip by wet-etching the magnetic material layer exposed by the mask.

5. The method of claim 4, wherein the mask has a rectangular shape and the main pole tip has a pyramid shape.

6. The method of claim 2, wherein the forming of the conical main pole tip comprises:
    forming a photoresist layer on the second insulating layer;
    forming a hole having a truncated conical shape in a region of the photoresist layer corresponding to the vertical portion of the main pole; and
    forming the conical main pole tip by sputtering or E-beam depositing a magnetic material from above the photoresist layer.

7. The method of claim 1, wherein the forming of the horizontal portion of the return yoke further comprises forming an insulating layer covering the main pole tip; and forming the horizontal portion of the return yoke to make a gap between the main pole tip and the horizontal portion of the return yoke.

8. The method of claim 1, wherein the forming of the vertical portion of the main pole comprises forming the vertical portion of the main pole to have multiple layers.

9. A method of manufacturing a vertical magnetic recording head comprising:
    (a) forming a horizontal portion of a main pole on a substrate;
    (b) forming a first insulating layer on the horizontal portion of the main pole;
    (c) forming first holes that exposes both ends of the horizontal portion of the main pole;
    (d) forming a vertical portion of the main pole and a vertical portion of a return yoke in the first holes to protrude above the first insulating layer;
    (e) forming a coil layer on the first insulating layer;
    (f) forming a second insulating layer on the first insulating layer covering laterals of the vertical portion of the main pole and the vertical portion of the return yoke;
    (g) forming a conical main pole tip on the vertical portion of the main pole; and (h) forming a horizontal portion of the return yoke between the conical main pole tip and the vertical portion of the return yoke.

10. The method of claim 9, wherein the forming of the conical main pole tip comprises:
   stacking a sacrificial layer and a metal layer on the second insulating layer;
   forming a second hole and a third hole respectively in the sacrificial layer and the metal layer; and
   forming the conical main pole tip by sputtering or E-beam depositing a magnetic material through the second hole and the third hole from above the metal layer.

11. The method of claim 9, wherein the forming of the conical main pole tip comprises:
   forming a magnetic material layer on the second insulating layer;
   forming a mask on the magnetic material layer; and
   forming the conical main pole tip by wet-etching the magnetic material layer exposed by the mask.

12. The method of claim 11, wherein the mask has a rectangular shape the main pole tip has a pyramid shape.

13. The method of claim 12, wherein the forming of the conical main pole tip comprises;
   forming a photoresist layer on the second insulating layer;
   forming a hole having a truncated conical shape in a region of the photoresist layer corresponding to the vertical portion of the main pole; and
   forming the conical main pole tip by sputtering or E-beam depositing a magnetic material from above the photoresist layer.

14. The method of claim 9, wherein the forming of the horizontal portion of the return yoke further comprises forming a third insulating layer covering the main pole tip; and
   forming the horizontal portion of the return yoke to make a gap between the main pole tip and the horizontal portion of the return yoke.

15. The method of claim 9, wherein the forming of the vertical portion of the main pole comprises forming the vertical portion of the main pole in multiple layers.

16. The method of claim 9, wherein the forming of the coil layer on the first insulating layer further comprises:
   forming a third insulating layer covering the coil layer on the first insulating layer; and
   forming a second coil layer on the third insulating layer.

* * * * *